United States Patent Office 3,375,059
Patented Mar. 26, 1968

3,375,059
OXIDATION OF WASTE GASES USING PLURAL CATALYSTS IN SERIAL ZONES
Clarence G. Gerhold, Palatine, Ill., assignor to Universal Oil Products Company, Des Plaines, Ill., a corporation of Delaware
No Drawing. Filed July 1, 1964, Ser. No. 379,748
3 Claims. (Cl. 23—2)

ABSTRACT OF THE DISCLOSURE

Combustion of vehicular exhaust gases by passing the gases in admixture with $O_2$, either upflow or downflow, through a particle-form catalyst bed containing a major portion of high ignition temperature catalyst particles and a minor portion of low ignition temperature or "ignitor" catalyst particles. The ignitor particles, as a class, are of different size than the bulk or high ignition temperature particles, so that when the bed is subjected to agitation, as by natural road vibration of the vehicle, the ignitor particles tend to stratify as a layer above (for downflow) or below (for upflow) the bulk particles, the purpose being to assure concentration of the ignitor particles in the inlet part of the bed.

---

This invention relates to the catalytic oxidation of waste gases. More particularly the invention is directed to an improved process for the oxidative conversion of vehicular exhaust gases to less harmful products by contacting such gases with a confined particle-form bed of oxidation catalyst, a minor portion of which is highly active, possessing a relatively low ignition temperature, and the major portion of which has a higher ignition temperature.

It is known in this art to pass the waste gases, in admixture with oxygen, through two or more separate catalytic zones connected in series; see, for example, U.S. Patent 2,664,340. The first or upstream zone contains catalyst of high activity and the second or downstream zone contains catalyst of lower activity. The highly reactive catalyst, sometimes referred to as "ignitor catalyst," is capable of initiating the oxidation reactions at a substantially lower temperature than the less active catalyst would do by itself. The reaction taking place on the ignitor catalyst raises it to higher temperature which is subsequently transferred to the less active catalyst, causing the latter to also become effective in bringing about the reaction. The difference in activities is usually obtained by differences in catalyst composition and/or activator content, the term "activator" connoting a catalytically active metal having oxidizing activity. Generally speaking, the greater the activator content, the higher the activity of the catalyst and the greater its cost. By this technique the waste gas conversion can be brought about by much lower initial temperatures than would be obtained through the use of catalyst of uniform composition and having the same total activator content as the plural catalysts taken together.

The plural bed system of the prior art suffers several disadvantages. One is the need for additional baffling or screening means within the catalytic convertor to maintain the beds separated and the ignitor catalyst positioned at the inlet of the convertor. This adds to the complexity and cost of the hardware. Another disadvantage is the difficulty in loading fresh catalyst or replacing spent catalyst, either by disassembling the convertor or by employing separate particles loading nozzles. Another drawback is that the catalyst replacement service must maintain individual inventories of ignitor catalyst and bulk catalyst and, with regard to loading the convertors, must exercise care to see that the proper catalyst is placed in the correct chamber.

The present invention is directed to an improved ignitor bed-bulk bed oxidation catalyst system which eliminates these disadvantages. In accordance therewith, the catalyst is employed in a vertical flow convertor, that is, an upflow or downflow convertor; one suitable convertor which may be employed is described in U.S. Patent 3,054,664. The ignitor catalyst particles as a class are made of a different size than the bulk catalyst as a class. The ignitor catalyst can be mechanically mixed with the bulk catalyst in the desired proportion prior to being loaded into the convertor. When the convertor is placed in service, it is subjected to periodic or continual agitation which, in the case of automotive use, is naturally imparted by the vibration or bouncing of the vehicle as it is being driven. This agitation, in combination with gravity, effects a size classification or separation as between the ignitor catalyst particles and the bulk catalyst particles, whereby the catalysts become separated and maintained apart in two zones or lyers, one above the other. Depending on the relative sizes, the ignitor catalyst can be concentrated in the upper portion of the oxidation zone (for downflow convertors) or in the lower portion of the oxidation zone (for upflow convertors). The invention therefore affords substantial advantages in obviating the need for additional baffling or screening means within the convertor and in simplifying the loading and inventory problems above described.

It is therefore a broad embodiment of the invention to provide a process for burning combustibles contained in a waste gas stream which comprises passing said stream, in admixture with oxygen and at oxidation temperature, vertically through a bed of oxidation catalyst particles, a minor portion of said particles having a relatively low ignition temperature and serving as ignitor particles and the major portion of said particles having a higher ignition temperature, said ignitor particles being of substantially different size than said higher ignition temperature particles; and agitating said bed at least periodically, the relative sizes of the ignitor particles and of the higher ignition temperature particles being selected in relation to the direction of gas flow through the bed so that the ignitor particles are concentrated by such agitation in the waste gas inlet part of the bed.

The ignitor catalyst will, in general, constitute less than 50% by weight of the total catalyst employed in the oxidation zone, and preferably comprises from about 5% to about 40% by weight of the total catalyst. Both the ignitor catalyst and the less active bulk catalyst comprise one or more activators composited on a particle-form high surface area refractory oxide carrier. Suitable activators include platinum, palladium and other platinum group metals, iron, cobalt and copper. Suitable refractory oxide carriers include alumina, alumina-silica and alumina-zirconia. Other oxidation catalyst compositions which may be employed are described, for example, in U.S. Patents 3,054,664 and 3,121,694. Inasmuch as oxidation catalysts and methods for manufacturing them are well known in the art, and the particular catalyst composition per se is not essential to the invention herein, a more detailed description of operative oxidation catalysts or their preparation is unnecessary.

The difference in activities as between the ignitor catalyst and the bulk catalyst can be brought about by using the same activator in both catalysts but in different concentrations, that is, the ignitor catalyst will have the greater activator content. For example, the ignitor catalyst and bulk catalyst may both comprise platinum on an alumina support, the ignitor catalyst containing from about 0.3% to about 5% platinum by weight, and the bulk catalyst containing from about 0.01% to about 0.1% platinum by weight. In general, the ratio of ignitor platinum concentration to bulk platinum concentration should be at least 3 and preferably will be in the range of 3–500. The relative proportions of ignitor catalyst and bulk catalyst are such as to provide an average platinum content, with respect to the entire bed, in the range of from about 0.05% to about 0.2% by weight, the same having been proven commercially practical from the standpoint of cost, consistent with the desired low ignition temperature.

Alternatively, the difference in activities can be effected by using different activators for the ignitor catalyst and the bulk catalyst. For example, the ignitor catalyst may comprise 0.1–5% by weight of platinum on alumina, while the lower activity catalyst may comprise 0.5–20% by weight of iron, cobalt, copper or vanadium on alumina. Regardless of the specific catalyst compositions involved, the more active ignitor catalyst is characterized as having a relatively low ignition temperature, which, for vehicular exhaust gas oxidation applications, is typically below about 350° F. and more particularly in the range of 300°–340° F. The less active bulk catalyst will have a substantially higher ignition temperature, generally above about 370° F. and more particularly in the range of 375°–600° F. The ignition temperature of the ignitor particles should be at least 20° F. below that of the bulk catalyst particles in order to realize the fullest advantages of this invention.

The ignition temperature of any given catalyst, for the purpose of this application, is determined by a benzene ignition test wherein a 10 cubic centimeter volume of the catalyst to be tested is placed in a 1 inch I.D. electrically heated reaction tube. Thermocouples placed at the bed inlet and bed outlet are connected to a strip chart potentiometer temperature recorder. A stream of nitrogen at a flow rate of 200 cc. per minute, under substantially atmospheric pressure, is bubbled through a bath of liquid benzene maintained at a temperature of about 20° C.; the nitrogen-benzene vapor effluent is then admixed with a stream of air flowing at the rate of 5 liters per minute, under substantially atmospheric pressure, and the air-nitrogen-benzene vapor mixture is then passed through the catalyst bed. The reaction tube is gradually and steadily raised in temperature. Before ignition takes place, the inlet and outlet temperatures, although increasing, remain equal. At the ignition point, the outlet temperature will suddenly increase at a faster rate than the inlet temperature and will commence to diverge therefrom until equilibrium conditions are reached. After equilibrium is established, the inlet and outlet temperature plots become parallel lines that are separated by a distance representing the differential temperature rise. The point of divergence between the two lines is then taken as the ignition temperature of the catalyst.

The oxidation catalyst particles may be of any desired shape e.g., spheres, cubes, cylinders, extrudates, ellipsoids, irregularly shaped particles, etc. The preferred shape is the sphere since this is easy to manufacture, assures uniformity of gas flow through the catalyst bed, and is most amenable to size separation by classification action.

The relative sizes of the ignitor particles and bulk particles are selected in accordance with whether an upflow convertor or downflow convertor is employed. In the case of a downflow convertor having an upper waste gas inlet and lower effluent outlet, the ignitor particles are made substantially larger than the bulk particles. As the catalyst bed is being agitated or shaken, the smaller bulk particles congregate in the lower part of the bed, leaving the larger ignitor particles concentrated in the upper portion of the bed contiguous to the inlet. In the case of an upflow convertor having a lower waste gas inlet and an upper effluent outlet, the ignitor particles are made substantially smaller than the bulk particles. As the catalyst bed is being agitated or shaken, the smaller ignitor particles become concentrated in a layer in the lower part of the catalyst bed contiguous to the inlet. In order to assure a reasonably efficient separation of the ignitor particles and the bulk particles, in the case of spherical particles, the ratio of the diameter of each of the larger spheres ($D_L$) to the diameter of each of the smaller spheres ($D_S$) should be at least 1.1, and preferably is at least 2.0 or greater. When non-spherical particles are employed, the "diameter" thereof is defined as the diameter of a sphere of equal volume. As an example of the particle sizes which may be utilized in this invention, but not by way of limiting the broad scope thereof, the smaller particles may have a diameter within the range of 0.03–0.15 inch, the larger particles may have a diameter of 0.10–0.50 inch, with $D_L/D_S$ being equal to or greater than 1.1. The particle sizes may be established during preparation of the refractory oxide support; a convenient method of making spherical particles is the well-known oil drop method set forth in U.S. Patent 2,620,314, the sphere diameter being fixed by the size of the dropping tip.

The benefits and advantages of the present invention are further demonstrated by the following example. It is not intended that the invention be limited to the specific catalysts, proportions or conditions therein set forth:

The effect of particle size difference as between ignitor catalyst and bulk catalyst, in conjunction with bed agitation, is evaluated by an apparatus comprising two tubular, vertically oriented downflow convertors (designated as convertors A and B) which are mounted on a reciprocable frame adapted to oscillation in the vertical direction. A mechanical vibrator is coupled to the frame. A gas cylinder of a synthetic blend of automobile exhaust gas containing 1.5% CO by volume and 1000 p.p.m. $CH_4$ is connected to the convertor inlets through an electrical heater capable of heating the exhaust gas to any desired temperature within the experimental range. Means are provided for regulating the rates of flow of exhaust gas to each of the convertors and for introducing secondary air into the convertor inlet lines at controlled rates of flow. Convertor inlet and outlet temperatures are measured and recorded by correspondingly placed thermocouples connected to a strip chart potentiometer recorder.

Each convertor is loaded with 500 grams of spherical platinum-alumina catalyst, the same being a random mechanical mixture of high platinum ignitor particles (0.5% platinum by weight) and low platinum bulk particles (0.056% platinum by weight). The ignitor particles constitute 10% by weight of the total catalyst load of each convertor, and the bulk particles constitute the remaining 90%, the overall average platinum content being 0.1% by weight. Sphere sizes and ignition temperatures are as follows:

| | Ignitor | | Bulk | |
|---|---|---|---|---|
| | Sphere diameter, inches | Ignition [1] Temp., °F. | Sphere diameter, inches | Ignition [1] Temp., °F. |
| Convertor A | ⅛ | 315 | ¹⁄₁₆ | 310 |
| Convertor B | ¹⁄₁₆ | 450 | ¹⁄₁₆ | 450 |

[1] Measured by above described benzene ignition test.

It will be seen that, in converter A, the ignitor particles average twice the diameter of the bulk particles; in convertor B, they are approximately equal.

After the convertors are loaded, and without any vibration thereof, the exhaust gas flow to each convertor is commenced at 2000 cc./min. together with 30% excess air. Heating of the exhaust gas stream is gradually increased and the ignition temperature of each catalyst bed is determined in the same manner as the benzene ignition test. The exhaust gas flow is then halted and the convertors and their catalyst beds are allowed to cool down to about 150° F.; at the same time, the vibrator is turned on and the beds are agitated for 30 minutes at a frequency of 1 c.p.s. and amplitude of 0.10 inch. The exhaust gas flow is then resumed and the ignition temperatures again determined as before. The results appear in Table I:

TABLE I

| | Ignition Temperature, ° F. | |
|---|---|---|
| | Before Agitation | After Agitation |
| Convertor A | 390 | 363 |
| Convertor B | 388 | 385 |

Convertor A in which the ignitor particles are of different size than the high ignition temperature particles, achieves a 27° F. drop in ignition temperature after agitation, whereas no significant reduction of ignition temperature is obtained in the case of convertor B in which all particles have the same size.

It is also within the scope of this invention to utilize more than two fractions of catalyst having different ignition temperatures and particle sizes. For example, the catalyst may consist of three or four portions of particles which, in response to vibratory action on the bed, will separate into three or four vertically superimposed layers, the layer closest to the waste gas inlet having the lowest ignition temperature and successive layers, progressing toward the outlet, having increasingly higher ignition temperatures.

I claim as my invention:

1. Process for burning combustibles contained in a waste gas stream which comprises passing said stream, in admixture with oxygen and at oxidation temperature, vertically through a bed of oxidation catalyst particles, a minor portion of said particles having a relatively low ignition temperature and serving as ignitor particles and the major portion of said particles having a higher ignition temperature, said ignitor particles as a class being of substantially different size than said higher ignition temperature particles; and agitating said bed at least periodically, the relative sizes of the ignitor particles and of the higher ignition temperature particles being selected in relation to the direction of gas flow through the bed so that the ignitor particles are concentrated by such agitation in the waste gas inlet part of the bed, the ratio of the diameter of each of the larger particles to the diameter of each of the smaller particles being at least 1.1.

2. Process for burning combustibles contained in a waste gas stream which comprises maintaining a bed of oxidation catalyst particles in an oxidation zone having an upper inlet and a lower outlet, a minor portion of said particles having a relatively low ignition temperature and serving as ignitor particles and the major portion of said particles having a higher ignition temperature, said ignitor particles as a class being of substantially larger size than said higher ignition temperature particles, the ratio of the diameter of each of the larger particles to the diameter of each of the smaller particles being at least 1.1; passing said stream, in admixture with oxygen and at oxidation temperature, to said inlet and downwardly through said bed; and agitating said bed at least periodically so that the ignitor particles are concentrated by such agitation in the upper portion of the bed.

3. Process for burning combustibles contained in a waste gas stream which comprises maintaining a bed of oxidation catalyst particles in an oxidation zone having a lower inlet and an upper outlet, a minor portion of said particles having a relatively low ignition temperature and serving as ignitor particles and the major portion of said particles having a higher ignition temperature, said ignitor particles being of substantially smaller size than said higher ignition temperature particles, the ratio of the diameter of each of the larger particles to the diameter of each of the smaller particles being at least 1.1; passing said stream, in admixture with oxygen and at oxidation temperature, to said inlet and upwardly through said bed; and agitating said bed at least periodically so that the ignitor particles are concentrated by such agitation in the lower portion of the bed.

References Cited

UNITED STATES PATENTS

| 2,071,119 | 2/1937 | Harger | 23—2 |
| 2,909,415 | 10/1959 | Houdry | 23—2 X |
| 3,086,839 | 4/1963 | Bloch | 23—2 |
| 3,018,841 | 1/1962 | Gerlich | 181—56 |
| 3,113,000 | 12/1963 | Gerhold | 23—288 |
| 3,169,836 | 2/1965 | Davis | 23—288 |

FOREIGN PATENTS 1,297,352  5/1962  France.

EDWARD J. MEROS, *Primary Examiner.*

OSCAR R. VERTIZ, *Examiner.*

A. GREIF, *Assistant Examiner.*